April 30, 1968 W. C. TRETHEWEY 3,380,463
VISCOSITY MEASURING PROCESS AND APPARATUS
Filed July 30, 1965 7 Sheets-Sheet 1

HIGH VISCOSITY

LOW VISCOSITY

RECORD FOR FIGURE 2

RECORD FOR FIGURE 3

INVENTOR.
WILLIAM C. TRETHEWEY
BY
*Staelin & Overman*
ATTORNEYS

April 30, 1968  W. C. TRETHEWEY  3,380,463
VISCOSITY MEASURING PROCESS AND APPARATUS
Filed July 30, 1965  7 Sheets-Sheet 2

INVENTOR.
WILLIAM C. TRETHEWEY
BY
Staelin + Overman
ATTORNEYS

April 30, 1968   W. C. TRETHEWEY   3,380,463
VISCOSITY MEASURING PROCESS AND APPARATUS
Filed July 30, 1965   7 Sheets-Sheet 4

INVENTOR.
WILLIAM C. TRETHEWEY
BY
Staelin + Overman
ATTORNEYS

United States Patent Office 3,380,463
Patented Apr. 30, 1968

3,380,463
**VISCOSITY MEASURING PROCESS
AND APPARATUS**
William C. Trethewey, Newark, Ohio, assignor to
Owens-Corning Fiberglas Corporation, a corporation of Delaware
Filed July 30, 1965, Ser. No. 476,042
22 Claims. (Cl. 137—4)

ABSTRACT OF THE DISCLOSURE

Method and apparatus for measuring the viscosity of liquid materials directly, particularly molten glass, wherein a selected rate of gas bubble formation beneath the surface of a liquid provides a highly viscosity-sensitive back pressure signal on the constant volume stream of gas used to produce the bubbles.

---

This invention relates to the measurement of viscosity of liquid materials, and more particularly to the measurement of viscosity of molten glass and analagous heat-softenable materials.

Still further, this invention relates to novel process and apparatus for measuring viscosity of liquids.

Still further, the present invention relates to the measurement of viscosity of liquid materials under both constant head and changing head conditions.

Still more particularly this invention relates to process and apparatus for measuring the viscosity of liquids in either open or closed containers or conduits under static conditions; and in either open or closed conduits, under dynamic flow conditions.

Still further, this invention relates to the simultaneous measurement of both viscosity and head or level of liquids.

Still further, this invention relates to the measurement and control of viscosity and composition of a mass of liquid by controlling the feed of a viscosity-influencing ingredient into the mass, based upon temperature-viscosity constants for a given compositional analysis.

*The problem.—Viscosity measurement and control in situ on a continual basis*

Molten glass is a difficult material to handle. It must be processed in heat-resistant and corrosion-resistant receptacles at very high temperatures.

It is to be understood that the measurement of viscosity of molten glass inside these receptacles at the existent elevated temperature is an extremely difficult operation. When an attempt is made to remove a sample of molten glass from its environment for purposes of measuring viscosity, the temperature of the sample will quickly drop as it is withdrawn and the drop will produce a sharp viscosity change because viscosity is temperature dependent. Thus, the measured viscosity would not reflect the in situ melting conditions. Further, while the sample is being removed for purposes of making the viscosity measurement, it may change due to oxidation in the ambient atmosphere so that the test is meaningless for purposes of control. On the other hand the entire mass may change and the change will not be sensed in the withdrawn sample.

Therefore, any accurate and reliable system for measuring viscosity of molten glass requires that the measurement be made in situ, that is, within the melting furnace or other—while the glass is actually being manufactured.

Thus, a substantial advance would be provided by turning the manufacture of glass from an art into a highly exact science by process and apparatus for continually monitoring factors of viscosity, composition and temperature in situ in glass melting and analagous operations related to heat-softenable materials.

*Continuous processing*

The foregoing discussion might be related to a batch-type glass processing operation. In addition to that, and more commonly employed for large volume operations, glass is processed on a continuous basis. This type of operation is used for the manufacture of fibers by the blast attenuation process to produce insulating bats and the like; for the manufacture of plates and sheets of glass; and others.

The success of these operations is closely related to the galss tank operator's ability to closely control the various factors of the glass, including viscosity, temperature, and composition at the point or instant of forming the end product from a large molten mass of glass, such as 100 tons or more that is melted and refined in a glass melting furnace.

In the usual glass melting furnace, the glass is formed by melting powdered batch materials in a larger section of the furnace called the melting chamber. The glass moves from the batch fusion area at one end of the chamber to a fining zone at the other end, where it becomes thoroughly mixed and homogenized. One or more forehearths can be attached to the furnace to deliver the glass from the fining zone to a bushing, mold gob former, feed roll, bait or other for delivery from the furnace to the forming instrumentality.

Provision is usually made to adjust the heat level as necessary in the forehearth in an effort to control the forming viscosity and temperature as closely as possible for maximum production of high quality product.

Prior art attempts at controlling viscosity have actually worked in reverse. Thus the glass issuing from the delivery spout has been observed. If it is processing properly, no change is made in the forehearth. If, however, the glass is not processing properly due to being too cold and too viscous, heat is added to the forehearth. If the glass is too hot and the viscosity is too low, the heat input is reduced.

Thus, when there is evidence from a malfunction in the forming operation itself that the viscosity has changed, the heat input to the forehearth of melting zone as the case may require, is adjusted in an attempt to remedy the situation. By this time however bad product has been produced and the damage has already been done. Thus, since the operation works in reverse, the need for heat input adjustment becomes apparent only after the glass has passed through the forehearth and into the finished product and thus beyond the control point instead of while it is en route through the forehearth and thus still subject to control.

*To anticipate and prevent lost product*

Therefore, a further substantial contribution to the art would be provided by process and apparatus capable of continually monitoring (measuring) the viscosity of a flowing stream of molten glass and instantaneously adjusting the heat input as necessary to maintain the viscosity constant at the point of delivery—to assure highest throughput and optimum product quailty.

Further, a substantial advance to the art would be provided by process and apparatus capable of continually monitoring the viscosity, temperature, composition and level of a flowing stream of molten glass and instantaneously adjusting the heat input, composition and viscosity variables as necessary, based on instantly in process glass, to thereby maintain the variable factors constant at the point of delivery.

Further, a substantial advance to the art would be provided by process and apparatus for measuring the viscosity and level of liquids in general; and converting the signal so produced into recording and/or control functions, such as changing the viscosity of the liquid by either heat or addition of viscosity-influencing ingredient.

Objects

It is therefore an important object to provide process and apparatus for measuring viscosity of liquids.

A further object is to provide process and apparatus for measuring viscosity of glass and other heat-softenable materials during actual in situ formation and instantly adjusting changing variables.

A further object is to provide viscosity, temperature, composition and head measurement and control in processing operations for liquid materials.

A further object is to provide process and apparatus for measuring and controlling factors of viscosity, etc. of flowing liquids under dynamic flow conditions in closed conduits such as pipes and the like.

Other objects of this invention will appear in the following description and appended claims, reference being had to the accompanying drawings forming a part of this specification wherein like reference characters designate corresponding parts in the several views.

Figures of the drawings

Figure 12:
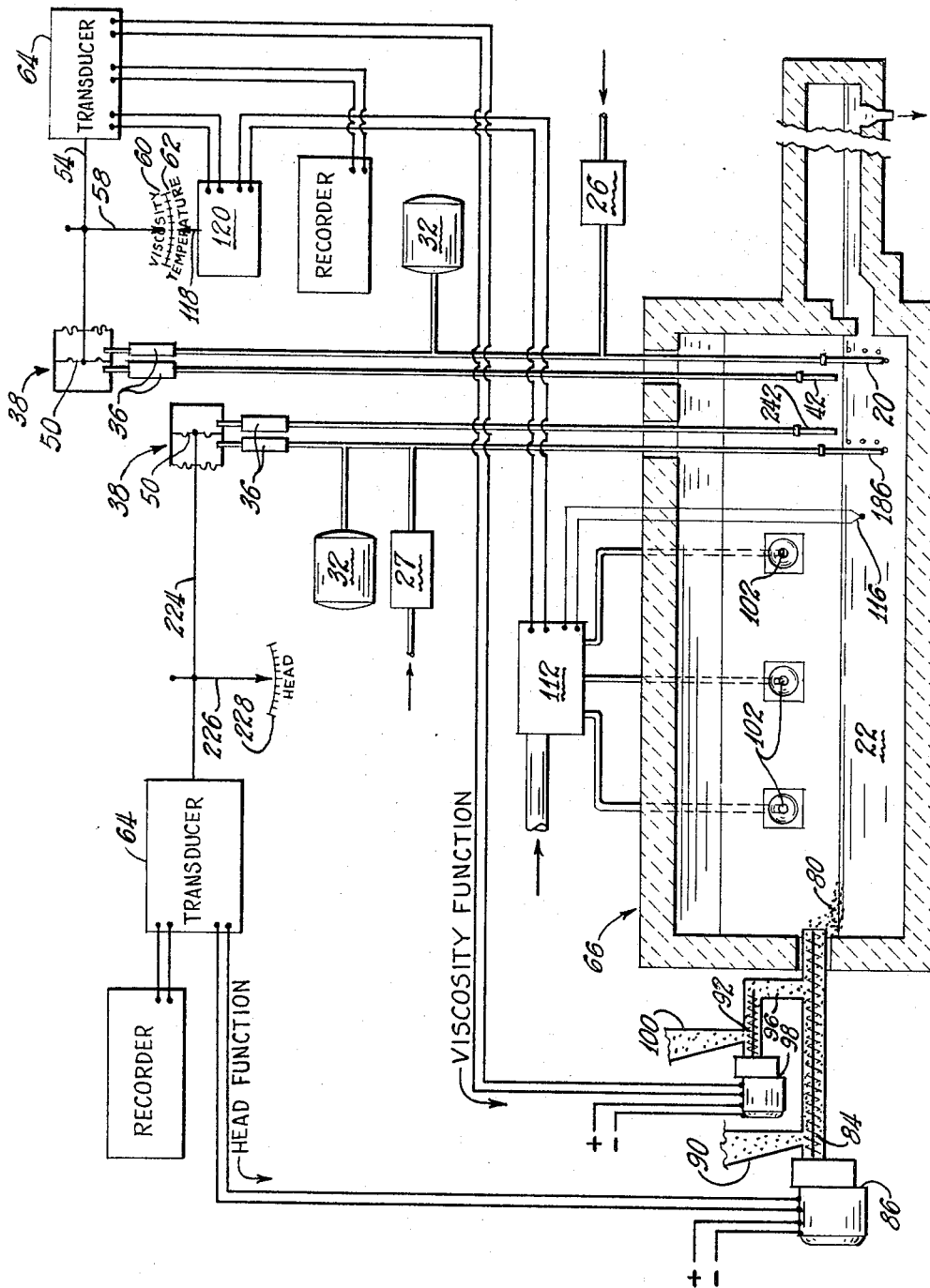
Figure 13:
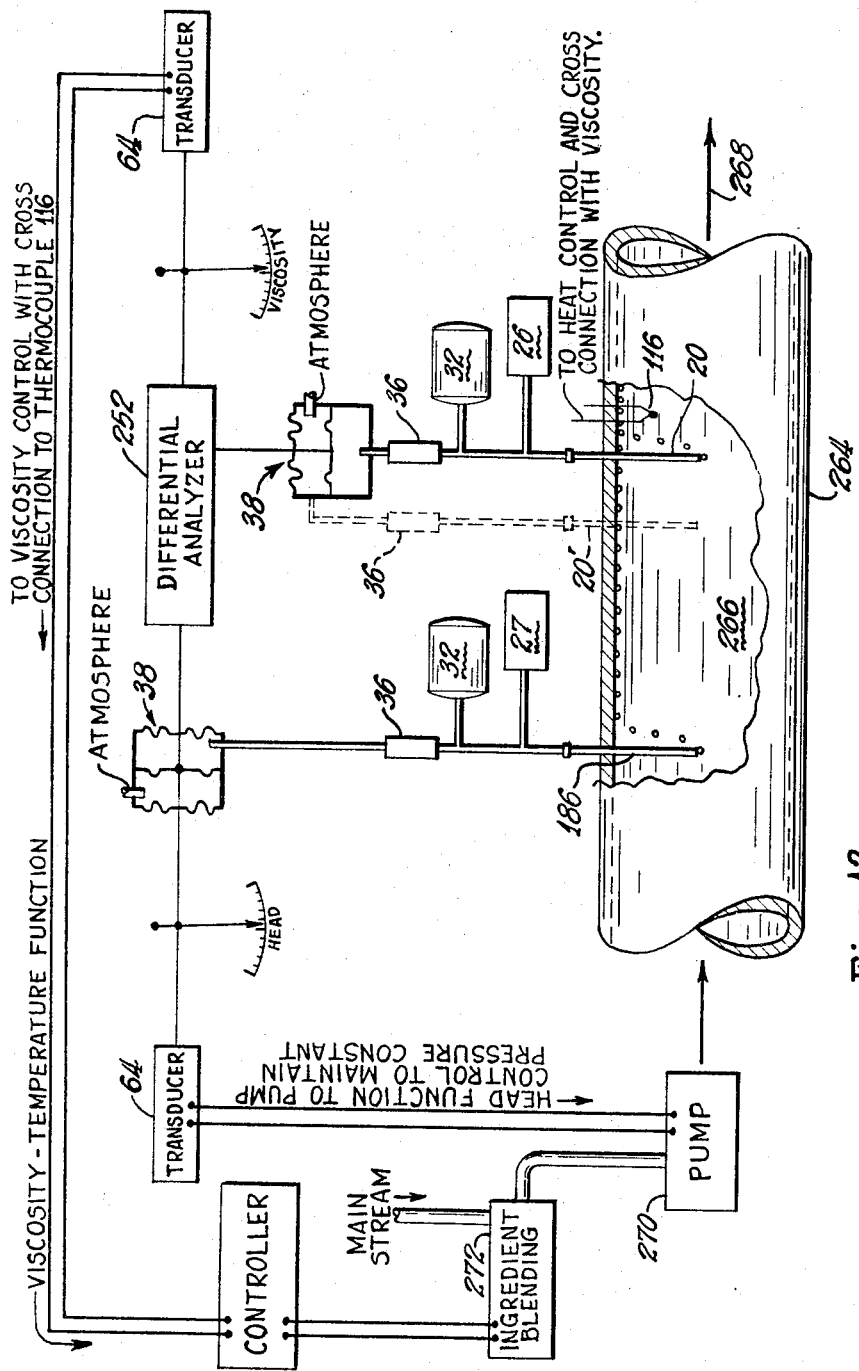

FIGURE 12 is a schematic illustration of two separate probe systems, one to measure and control head and retain it constant; and based on such constant head, a second probe system to produce a pure viscosity measurement that in turn can be converted into a function utilizing a thermocouple to record temperature as a cross-check on viscosity and thus control viscosity by varying the rate of feed of viscosity-influencing ingredients; and FIGURE 13 is a schematic illustration of a 2-probe system, incorporating a differential analyzer, for producing both pure viscosity and pure head signals under changing head conditions of flow of a liquid under pressure through a closed conduit.

Before explaining the present invention in detail it is to be understood that the invention is not limited in its application to the particular construction and arrangement of parts illustrated in the accompanying drawings, since the invention is capable of other embodiments and of being practiced and carried out in various ways. Also, it is to be understood that the phraseology or terminology employed herein is for the purpose of description and not of limitation.

Figure 1:
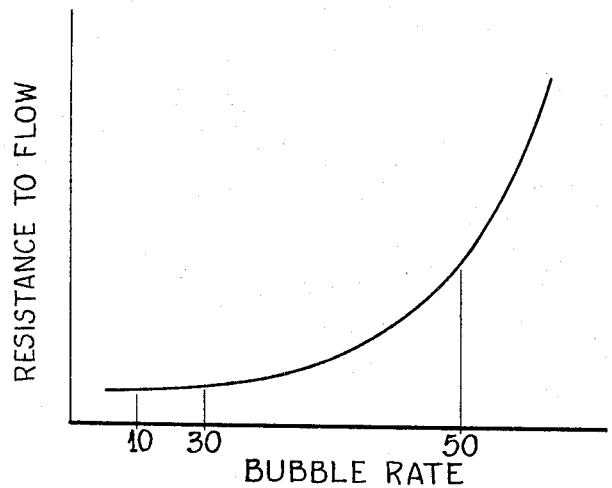
FIGURE 1 is a graph illustrating increased resistance to flow with increase in pressure or bubble rate, at constant head.
Figure 2:
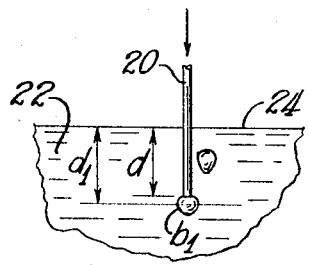
FIGURE 2 is a schematic illustration of bubble formation at the bottom of a probe in a high viscosity liquid.
Figure 3:
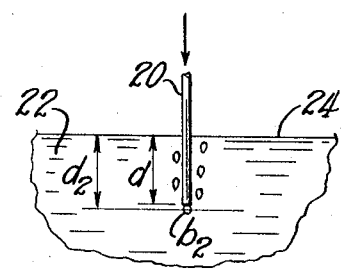
FIGURE 3 is a schematic illustration of bubble formation at the bottom of a probe in a low viscosity liquid.

The principles of the invention.—FIGURES 1, 2 and 3; constant level

The present invention is based on the fact that the back pressure of a gas bubbling into a liquid through a submerged probe tube changes with flow rate. It has been discovered that bubble frequency or rate is highly sensitive to viscosity within a selected range. Also, head is a factor that must be removed to produce a pure viscosity signal.

This is distinguishable from the measurement of head by measuring the back pressure at a lower constant flow rate where back pressure is highly sensitive to change in head and relatively insensitive to viscosity. Thus, at a lower bubble rate, level or head comes through as a substantially pure back pressure signal. This is shown at the left hand plateau of 10 to 30 bubbles per minute in FIGURE 1. Here, the resistance to flow is substantially constant. In terms of head at these bubble rates, viscosity exerts no practical effect.

At higher bubble rates however, such as 50 and more bubbles per minute in glass, a higher back pressure is encountered, as shown at the steep portion of the curve in FIGURE 1. Thus, the resistance to flow sharply increases at higher bubble rates. This means that at the greater back pressures produced, viscosity becomes a definite and measurable factor.

At constant gas flow at a higher viscosity of the liquid the bubbles are much more difficult to form and the frequency or pulse rate is decreased, while the amplitude of each pulse produced by forming a bubble is relatively high because of the larger bubble size.

At a lower viscosity the bubbles form much easier and the frequency or pulse rate is increased. But, the amplitude of each pulse is of a lower order of magnitude.

Therefore, by calibrating bubble rate in terms of viscosity, a signal can be produced that is a highly accurate measure of viscosity.

High viscosity

This is further illustrated in FIGURE 2. Thus the probe tube 20 is exposed to under glass pressure at depth $d$ within the molten glass 22. The level 24 remains constant so that depth $d$ remains constant. Gas bubbled through the probe 20 and through the glass 22 at the depth $d$ at a constant volume flow rate will create bubbles of a radius $d-d_1$. These are large and indicate a high viscosity of the glass 22. The bubbles $b_1$ are thus harder to form.

Low viscosity

This is illustrated in FIGURE 3. Thus the probe 20 is exposed to under glass pressure at the same constant depth $d$, the same as in FIGURE 1 because the level 24 does not change. Gas bubbled through the glass at depth $d$ and at the same constant volume rate as in FIGURE 1 will create more and smaller bubbles of a radius $d-d_2$. These are easier to form with low viscosity glass and they are smaller thus indicating a lower viscosity.

Measurement; high viscosity

Figure 4:
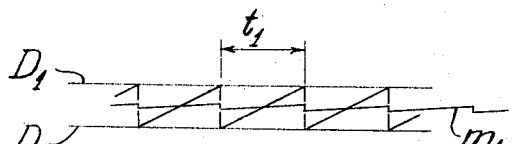
FIGURE 4 is a record of the back pressure developed by bubble formation in accordance with FIGURE 2.

FIGURE 2 represents large bubble formation. The center of the bubble $b_1$, as indicated by the depth $d_1$ produces a maximum back pressure. The depth $d_1$ is slightly deeper than the tube outlet at $d$, resulting in a greater pressure $D_1$, FIGURE 4. In FIGURE 4 the line D represents the lower pressure at the lesser depth $d$ of FIGURE 2. A resultant pressure differential $D-D_1$ is produced by each bubble. A record similar to the broad sweep of FIGURE 4 will be produced.

The time $t_1$ required to create each bubble $b_1$ is relatively long and thus a large sawtooth trace is produced. Note that this will have a mean record line $m_1$ if the amplitude is attenuated, as will be discussed later.

Low viscosity; FIGURE 3

With a glass of relatively low viscosity, the bubbles are easier to form and are smaller as in FIGURE 3. These smaller bubbles produce a pressure differential between the points $d$ and $d_2$, resulting in a fine sawtooth record $D$–$D_2$ as in FIGURE 5.

Figure 5:
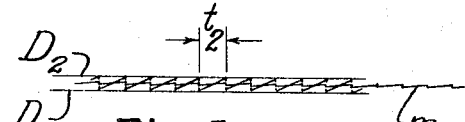
FIGURE 5 is a record of back pressure developed by formation of bubbles in accordance with FIGURE 3.

In FIGURE 5, line D represents the pressure at the lesser depth $d$ of FIGURE 3; and $D_2$ represents a greater pressure at the greater depth $d_2$ of FIGURE 3, the center line of a full bubble $b_2$ still at the bottom end of the probe tube 20.

The time $t_2$ in FIGURE 5 is relatively short and thus a small, higher frequency sawtooth record is produced. This also has a mean or average coefficient represented by the indicia $m_2$.

Figure 6:
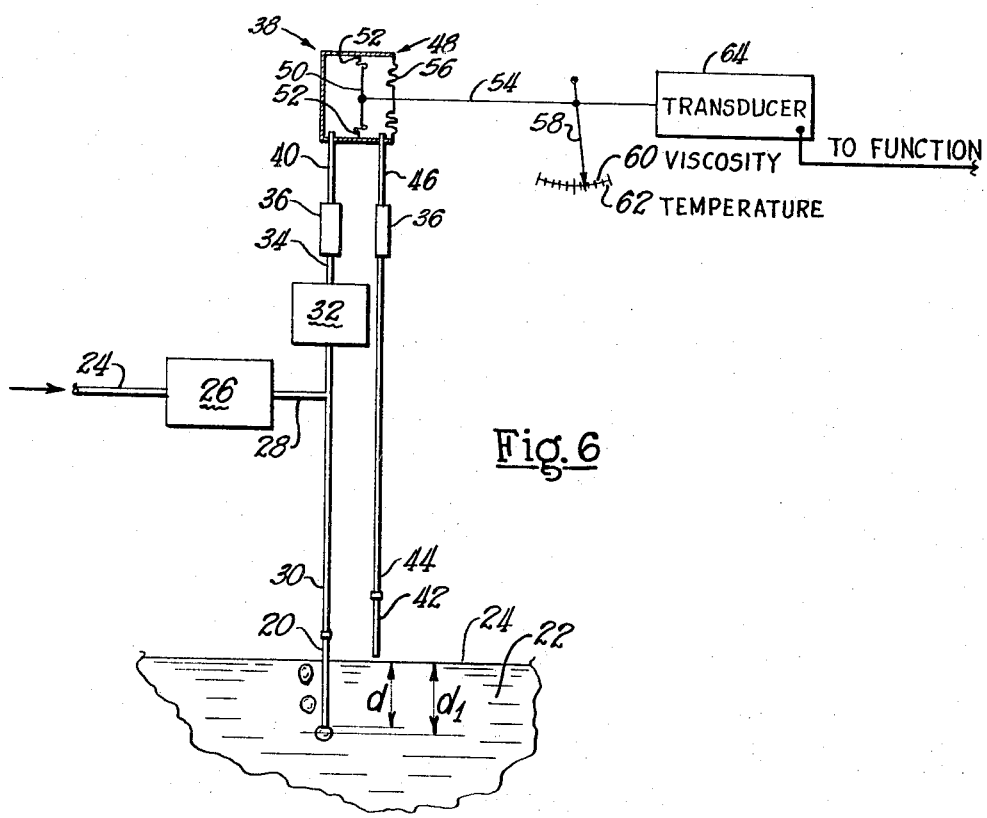
FIGURE 6 is a schematic illustration of a system for measuring viscosity where head remains constant.

Operable system to produce viscosity signal; fixed head; FIGURE 6

In the present embodiment of the invention, head is considered fixed and thus it can be treated as a constant.

Clean gas from a pressure regulator, at a pressure suitable to meet all conditions, is introduced via line 25 into a constant flow regulator 26. From the flow regulator 26, the gas passes through branch line 28 into main line 30 and down and out through the immersed bubbler probe 20 to function in the manner hereinbefore set forth in FIGURES 2 and 3.

From the main line 30, the gas also flows into a surge tank 32 where the pressure differential amplitude produced from bubble formation is smoothed out to some extent.

From the surge tank 32, the gas flows through line 34 and through a restrictor or filer 36 where the pressure differential amplitude of the bubble pulses is smoothed out still further.

By means of line 40 a connection is made into one side of a differential pressure detector cell 38.

Figure 7:
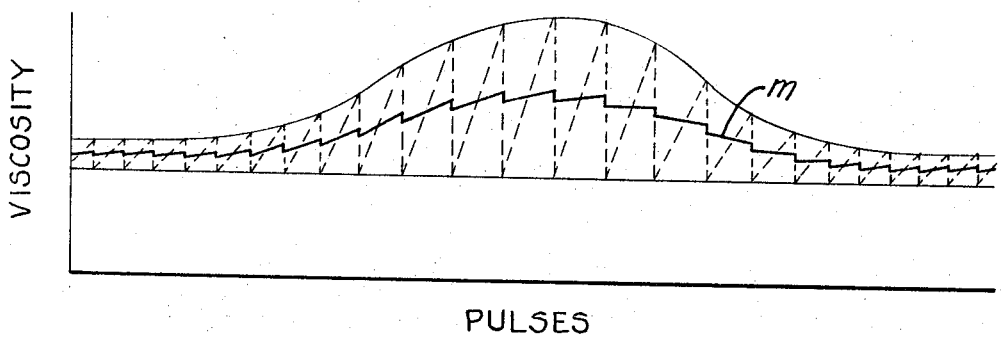
FIGURE 7 is an illustration of the manner in which the raw signal developed in accordance with FIGURE 6 is attenuated to reduce the amplitude of the pressure variations resulting from bubble formation, and indicating an essentially smooth mean pressure differential record on which bubble frequency is superimposed.

The manner in which the amplitude attenuation is effected is illustrated in FIGURE 7. At the left and right hand ends of the curve, the pulses are of short duration and the amplitude is relatively low, indicating the formation of small bubbles and a relatively low viscosity. At the center of the curve, the viscosity has increased and the pulse rate or frequency becomes slower, but of higher amplitude, representing the more difficult formation of large bubbles in the higher viscosity medium.

The median line $m$ running through the center of the curve shows the manner in which the signal is attenuated to a substantially smooth, yet sawtoothed line, containing both bubble frequency and pressure differential levels superimposed on one another.

The atmosphere probe and differential pressure detector cell

The remaining components of this embodiment of the invention include an atmosphere sensing probe 42. This side of the system also suitably includes a filter or restrictor 36 to which the probe 42 is connected by means of a line 44. A line 46 connects the filter 36 to the other side of the differential pressure cell 38.

The differential pressure detector cell 38 comprises a closed housing 48 having a movable diaphragm 50 therein, supported between flanges 52.

The movable diaphragm 50 and the support flanges 52 are secured to one another in gas-tight relation, and the flanges are also secured to the housing 48 in gas-tight relation to divide the housing into two halves, isolated from one another.

A signal pick-up arm 54 is connected at one end to the movable diaphragm 50 and extends out of the housing 48 through a flexible cover 56. A gas-tight seal is provided between the signal pick-up arm 54 and the flexible cover 56.

The signal pick-up arm 54 can be connected with a visual indicator needle 58 that moves relative to a viscosity scale 60, that can be extrapolated to a temperature scale 62 as will be developed below, presuming a constant composition of glass in the melt 22.

Additionally, the signal pick-up arm 54 is connected to a transducer 64 to amplify the signal and produce a function.

The unexpected result

By this arrangement, both viscosity (and temperature with constant composition) can be ascertained visually and additionally, the signal can be transduced for functions, including recording and/or control as will become apparent hereinafter.

The extrapolated temperature scale 62, referred to above, is established by using temperature-viscosity constants for a given composition of glass. This presumes that composition will be kept constant, in this instance. In the extended scope of the invention, a system utilizing a thermocouple as a double-check on composition is developed separately below to control the addition of a viscosity-influencing ingredient and thereby control composition.

For all practical purposes, the atmosphere above the molten glass 22 will change. This may arise from air pressure changes or by changes in the firing rate of burners used to produce the molten glass 22. Therefore, the atmosphere sensing probe 42 balances out any atmosphere fluctuations and removes this factor from the measured signal so that a pure viscosity signal is produced.

In those situations where atmosphere is that of the ambient air and relatively stable, the atmosphere sensing probe can be located some distance away from the immediate vicinity of the immersed probe tube 20. This may even comprise venting that side of the differential pressure detector cell 38 to the atmosphere at a point remote from the submerge probe tube 20. In such instance, a filter may not be necessary because of the relative absence of fluctuations.

Relative to FIGURES 6 and 7, viscosity comes through as an attenuated signal containing the following indicia:

(1) Bubble frequency rate; and
(2) Mean pressure differential.

The transducer 64 can be rendered sensitive to either of these factors. Appropriate signal attenuation will be used, depending upon which is selected.

Figure 8:
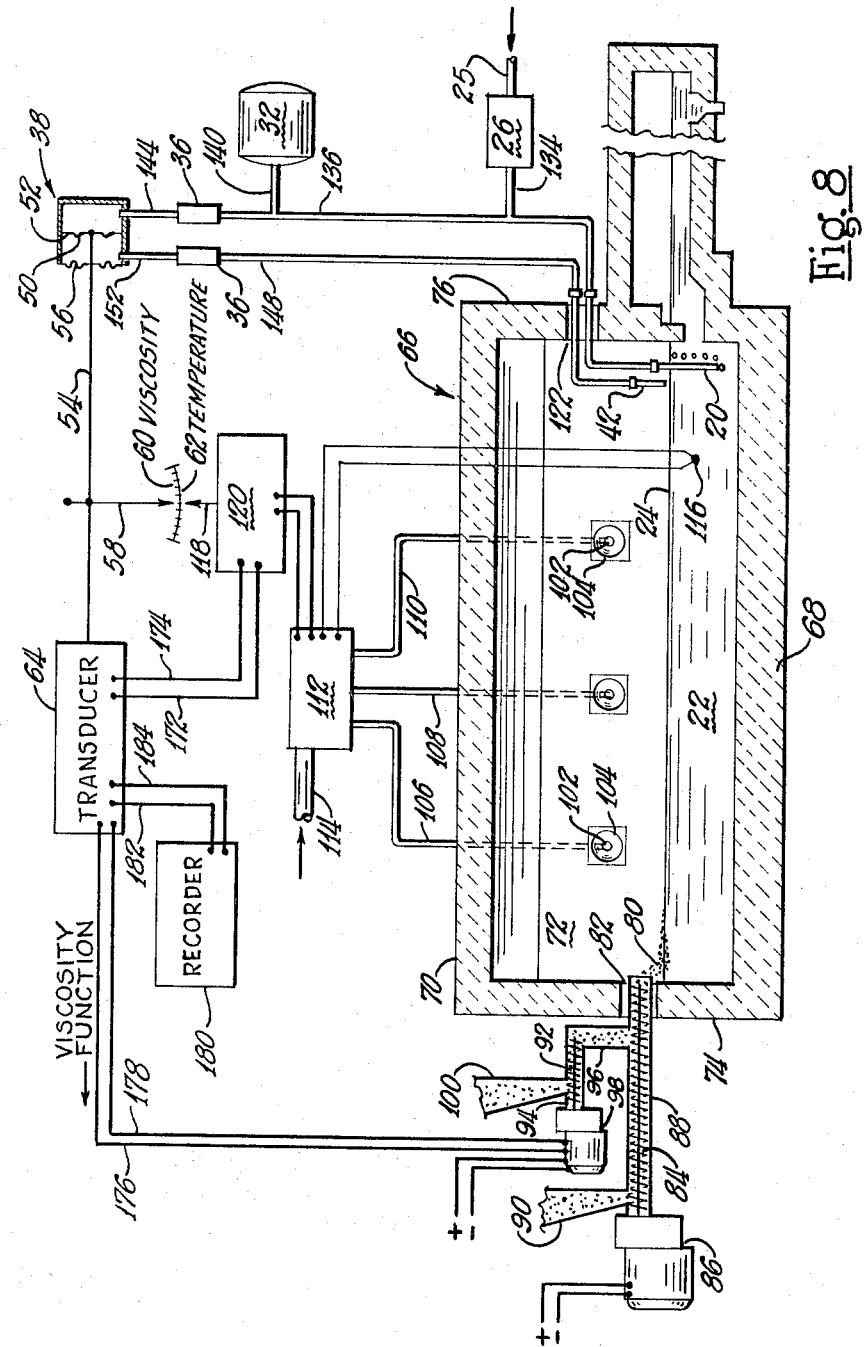
FIGURE 8 is a schematic illustration of the present invention as applied to the control of composition wherein head is held constant.

Extension of the invention; thermocouple for composition control; FIGURE 8

For a given glass composition, viscosity and temperature provide a single constant. That is to say, for each specific viscosity there is a specific temperature, for a given composition of glass.

Thus, by employing the principles set forth above in combination with a thermocouple, composition can be controlled. Thus, if temperature is held constant by means of the thermocouple, and if viscosity changes, this signals a change in composition due to the change in ratio of viscosity changing ingredient. By controlling the rate of feed of this element using the transduced viscosity signal, the viscosity can be controlled within close limits.

FIGURE 8 illustrates schematically a glass melting tank having a viscosity probe system of the invention associated with a thermocouple and control mechanism for proportioning the rate at which the viscosity-influencing material is fed into the melting tank in response to changes in viscosity of the glass in the tank, with the temperature of the glass being held constant, and with the head or level of the glass being held constant by appropriate means.

In this application, a glass melting tank 66 includes a refractory floor 68, a refractory roof arch 70, side walls 72 and end walls 74 and 76. The tank 66 contains a pool of molten glass 22.

The pool of molten glass 22 is developed by feeding blended batch materials 80 in through an opening 82 in the end wall 74. A primary screw feeder 84 is powered by a variable speed drive 86. The primary screw feeder 84 operates in an elongated tubular housing 88 into which powdered glass batch materials descend by gravity from a hopper 90. The elongated tubular housing 88 is connected into the opening 82 of the left hand end wall 74. Rotation of the feeder 84 in response to a suitable signal causes all of the powdered glass batch materials to be fed into the molten glass 22 at an appropriate rate.

Let it be noted at this point that the material from the hopper 90 can be considered as having a relatively lesser influence on the viscosity of the molten glass 22.

In this constant level embodiment, a suitable level control mechanism, not shown, is utilized to regulate the variable speed drive 86 to supply the entire batch materials to the glass melting tank 66 as required, in order to keep the level 24 of the pool of molten glass 22 constant.

To control the viscosity of the molten glass 22, a secondary screw feeder 92 is connected to feed into the primary screw feeder 84. The secondary screw feeder 92 operates in an elongated housing 94 which is connected by a vertical chute 96 in through the housing 88 near the furnace wall 74. The secondary screw feeder 92 is also powered by a variable speed drive 98. The viscosity-influencing ingredients are fed by gravity to the secondary screw feeder 92 from a hopper 100.

Thus a blending operation is provided in accordance with the invention, depending upon the proportionate rate at which the secondary feeder 92 works relative to the primary feeder 84.

The atmosphere above the pool of molten glass 22 is suitably gas fired. Alternately, electricity can be used to heat the pool of molten glass 22 by means of submerged electrodes, not shown. Gas burners 102 are inserted into ports 104 to project gas flames across the pool of molten glass 22 to control temperature and melt ingredients. Burners 102 are supplied with pressurized gas via lines 106, 108 and 110, in turn connected to a thermocouple-controlled firing regulator 112. Primary gas is introduced into the regulator 112 through a main supply line 114. In the regulator 112, the gas is manifolded out to the lines 106, 108 and 110 as required for firing conditions of a particular furnace.

A thermocouple 116 is immersed in the molten glass 22 and is connected to the firing regulator 112.

By means of a movable needle 118 in a control box 120, forming part of the thermocouple control system, the molten glass 22 can be kept at a desired temperature level. Thus, the heating means is controlled to hold the temperature of the glass constant, depending upon the setting of the movable needle 118. Under conditions of constant temperature, if there is a viscosity change, this will indicate a glass composition change. Therefore, by the present invention when viscosity is related to constant temperature, it can be employed to develop a signal to alter the feed of the viscosity-influencing ingredient from the hopper 100.

*The viscosity detector system*

The right hand end wall 76 of the furnace 66 is provided with an opening 122, positioned above the glass level 24. A bubbler probe 20 in the form of a high temperature-resistant metal tube is extended through the opening 122 and projects vertically downwardly with the open end immersed below the level 24 of the pool of molten glass 22. The probe 20 is fixed in space so that the open terminal end is at a fixed point in the molten glass 22.

The bubbler probe 20 is supplied with a constant volumetric flow of air or other suitable gas at a bubble rate in the range of about 50 or more bubbles per minute to sense the viscosity of the molten glass. For this purpose, a supply line 25 carrying gas from a suitable pressure regulator, not shown, feeds into a volumetric flow controller 26. A branch line 134 connects the flow controller 26 to a main line 136, to which the probe 20 is connected.

The main line 136 also connects to a surge tank 32 by means of a branch line 140, and is also connected to a restrictor or filter 36. From the restrictor 36, the gas passes through line 144 and into one side of a differential pressure detector cell 38.

Depending upon the firing conditions, the atmosphere above the pool of molten glass 22 may be subjected to slight pressure fluctuations. Accordingly, this embodiment incorporates an atmospheric sensing probe 42. Probe 42 is also a high temperature-resistant metal tube and is inserted through the hole 122 of the end wall 76. The terminal end is turned down to protect against entry of dust and the like.

The atmospheric probe 42 is connected to the other side of the differential pressure detector cell 38 by means of a line 148. A flow restrictor 36 is connected to the line 148 and gas flows from the restrictor into the pressure detector cell 38 by means of a line 152.

A signal pick-up arm 54 is connected at one end to the diaphragm 50 of the cell 38 and may engage a visual indicator needle 58. Viscosity 60 and temperature 62 scales are suitably provided.

Additionally, the signal pick-up arm 54 is connected to a transducer 64. By this arrangement, both viscosity and temperature can be ascertained visually, and additionally, the viscosity signal is amplified by the transducer 64 for recording and control functions.

It is to be understood that the transducer 64 is provided with a suitable power supply of its own in order to provide appropriate amplification to the signal from the pick-up arm 54.

In this embodiment of the invention, viscosity and temperature are interdependent. Therefore, the transducer 64 is connected to the thermocouple control box 120 by means of lines 172 and 174. The interconnection of the transducer 64 and the thermocouple control box 120 is effective to provide a null point where viscosity and temperature match, by opposite positions of the needles 58 and 118. However, when viscosity drifts away from temperature, which is held constant, a change in the rate of feed of the viscosity-influencing ingredient is called for. Thus, the transducer 64 is connected to the variable feeder 98 for the viscosity-influencing ingredient by means of lines 176 and 178.

*The recorder*

A recorder 180 is connected to the transducer 64 by means of lines 182 and 184. The recorder 180 is also provided with its own power supply, not shown, in order to convert the amplified signal from the transducer 64 into a permanent record.

*Operation*

All glass-forming materials are fed into the glass melting tank 66 by means of the primary screw feeder 84. These are melted by means of the heat of the melting zone, namely that produced by the burners 102. The thermocouple 116 regulates the burners 102 to keep the temperature of the pool of molten glass 22 constant. The viscosity bubbler 20 continually, that is in a successive, individual pulse manner, monitors the viscosity while the atmosphere sensing probe 42 subtracts atmosphere fluctuations. Thus, both pure viscosity and constant temperature are developed. Where the viscosity and temperature are in correct relation to one another for a given glass composition, the proportion of the viscosity-influencing ingredient fed from the hopper 100 by the variable feeder 98 will remain constant. However, should the viscosity drift away from the temperature, a change in composition is indicated. Instantaneously an amplified viscosity signal from the transducer 64 directs the variable feeder 98 to increase or decrease the proportion of viscosity-influencing ingredient and therefore the correction will be made.

Relative to the glass melting furnace 66 shown in this embodiment, it is to be understood that some lag might be encountered between the viscosity signal developed at one end or side of the furnace and the batch ingredients placed into the other side. The showing of FIGURE 8 is therefore schematic. Accordingly, it is to be understood that an optimum location of the thermocouple and viscosity bubbler system will make it possible to instantaneously control the viscosity of the melt for purposes of outfeed to a forming operation.

FIGURE 8 has been shown as a glass melting tank. However, the extended scope of the invention would include a much broader application as to syrup tanks, chemical processing tanks, and the like where viscosity is an important factor of the operation. It is to be understood that for example sugar could be fed to a syrup tank to bring viscosity to a desired level as established by a previous setting of the viscosity indicating arm 58. This would be effective to activate the proportioning screw feeder until the appropriate viscosity is reached. From the foregoing it will be evident to those skilled in the art that a broad range of applications of the principles of the invention can be made.

Up to this point, the description has related to a system wherein head is a constant factor. The following description is directed to conditions of changing head and the manner in which the invention is applied thereto.

Thus, the extended scope of the invention and the broader applications within the scope of the invention will become apparent to those skilled in the art.

Figure 9:
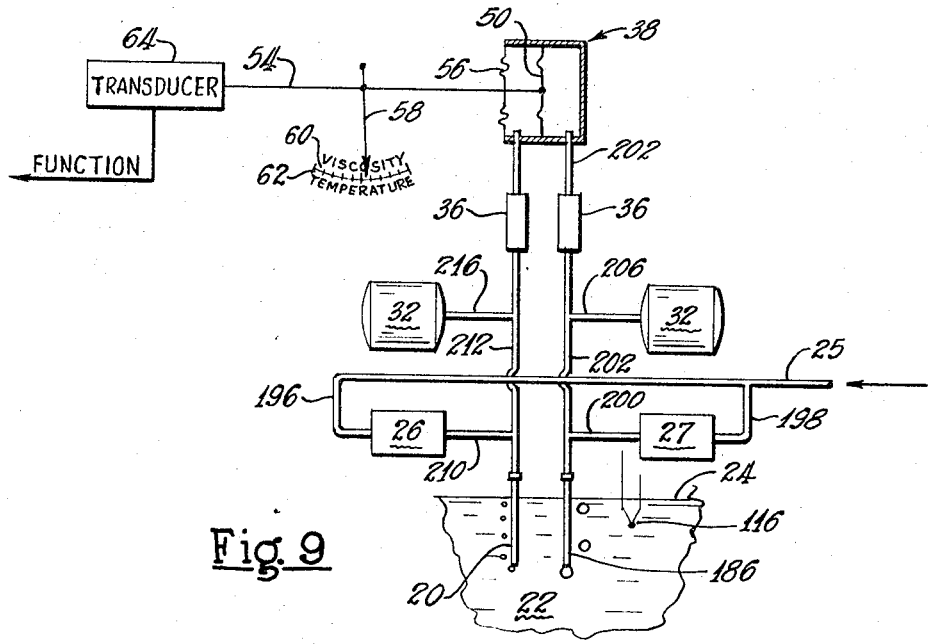
FIGURE 9 is a schematic illustration of a 2-probe system for producing a pure viscosity signal under changing head conditions.

*Operable system to produce viscosity signal; changing head; FIGURE 9*

This embodiment of the invention is applicable to use in a situation where the level of a liquid changes; and is capable of producing a pure viscosity signal by balancing out the head fluctuations.

Further, in this embodiment, viscosity can be produced as both visual and useable signals, and the latter converted into functions of recording and/or control. Thus, by employing a thermocouple in combination with the system as a constant temperature control, composition can be controlled as related to viscosity.

*Balancing out head*

In FIGURE 9, the probe 186 measures head at a bubble rate of 10–30 bubbles per minute as discussed above, see FIGURE 1. This probe tube 186 gives head as an asserted back pressure on the gas bubbled therethrough.

The probe 20, on the other hand measures viscosity at 50 or more bubbles per minute, where viscosity is a definite factor as discussed above, but head is of sufficient consequence that it must be removed in order to provide a pure viscosity signal.

The foregoing discussion presumes an immersion depth in the range of 1″–2″ for the probe tubes 186 and 20 when they are of dimensions set forth below under Practical Considerations. Further, both probes 186 and 20 are immersed to the same depth and therefore fluctuations of atmosphere are imposed equally on both probes and balance out of the system.

In order to attenuate the amplitude of the pulse produced by each bubble and thus convert the signal into a substantially smooth record, surge tanks and restrictors are utilized as described relative to the embodiments of FIGURES 6 and 8.

Clean gas from a pressure regulator, at a pressure suitable to meet all conditions, is introduced through main supply line 25 to each of two separate constant volumetric flow regulators 26 and 27 by means of branch lines 196 and 198.

*Level probe tube.*—From the constant volumetric flow regulator 27, the gas passes through branch line 200 into main line 202 and down and out through the submerged tip of the immersed level bubbler probe tube 186.

Constant flow of gas is provided by the flow regulator 27 to produce for example 10–30 bubbles per minute through the probe 186. In this instance, back pressure is very sensitive to level change, and will vary as the level of the liquid varies to provide a highly accurate level signal.

The level probe tube 186 is fixed in space by suitable support mechanism.

From the main line 202, the gas also flows into a surge tank 32 through a branch line 206 where the pulses from bubble formation are partially attenuated. Additionally, the gas flows from the main line 202 through a restrictor 36 where further attenuation of the amplitude of the bubble pulse takes place.

The main line 202 also extends beyond the restrictor and connects into one side of a differential pressure detector cell 38.

*The viscosity tube.*—From the constant flow regulator 26 the gas passes through the branch line 210 into a main line 212 and down and out through the submerged tip of the immersed viscosity bubbler probe tube 20.

Constant volumetric flow of gas is provided by the flow regulator 26 to produce 50 or more bubbles per minute. In this situation back pressure is very sensitive to viscosity fluctuations of the liquid to provide a highly accurate signal related to viscosity. Also, head is still imposed upon this signal and must be removed. This is done in the differential pressure detector cell 38.

The viscosity probe tube is fixed in space by appropriate support means not shown.

From the main line 212, the gas also flows into a surge tank 32 by means of branch line 216. Additionally, the gas flows on up the main line 212 and through a restrictor 36 where further attenuation of the amplitude of bubble pulses takes place.

The main line 212 continues on beyond the restrictor 36 into the other side of the differential pressure detector cell 38. This provides a connection between the other side of the differential pressure detector cell and the bubbler viscosity probe 20.

A signal pick-up arm 54 is connected at one end to the movable diaphragm 50 of cell 38 and at the other end to a transducer 64. The pick-up arm 54 may be connected to a visual indicator needle 58 that moves relative to viscosity and temperature scales 60 and 62. It is to be understood that the temperature scale is extrapolated and presumes a fixed composition in the liquid being measured.

By this arrangement, both viscosity and temperature can be ascertained visually.

*Operation*

Though atmosphere above the surface 24 of the liquid 22 may fluctuate, it is imposed equally upon each side of the system and is therefore balanced out. Further, head of liquid is removed by balancing it out of the system in the differential pressure detector cell 38. Therefore, viscosity is produced as a pure, but attenuated signal that is measureable as follows:

A. By bubble frequency rate; or
B. By means of mean pressure differential as discussed relative to FIGURE 7.

The transducer 64 can be made sensitive to either bubble frequency or mean pressure differential. Appropriate signal attenuation will be used, depending upon which is selected. The signal is transduced for functions as desired.

*Composition control*

A thermocouple 116 can be added to the system of FIG-

URE 9, as was done in FIGURE 8, so that the temperature of the liquid can be held constant. By holding the temperature constant, any variation in viscosity indicates a change of composition. Therefore, a selected viscosity-influencing ingredient can be added as desired to hold the viscosity constant, employing mechanism analogous to the proportional feeder combination 84, 92 shown in FIGURE 8.

*Measuring both viscosity and head under changing head conditions*

Figure 10:
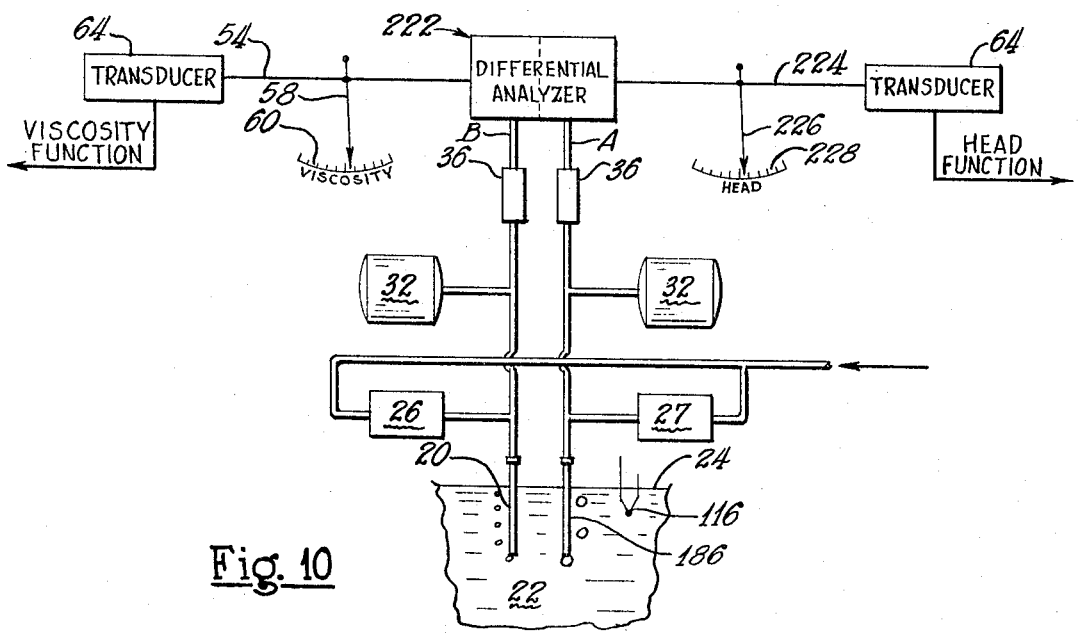
FIGURE 10 is a schematic illustration of a 2-probe system, incorporating a differential analyzer, for producing both pure viscosity and pure head signals under changing head condtions.

This embodiment of the invention is shown in FIGURE 10 and also utilizes two probes as in FIGURE 9. Instead of a differential pressure detector cell 38, however, this embodiment uses a differentiator or a differential analyzer so that both head and viscosity signals are produced in pure form. Thus, an advance is provided over the system of FIGURE 8 which produces viscosity only.

The present embodiment illustrates a logical extension of the invention wherein the head signal can be used to control the level of a body of liquid and the viscosity signal can be used in combination with a thermocouple to control the viscosity of the body of liquid.

Thus, in accordance with this embodiment, a head bubbler probe 186 is immersed beneath the surface 24 of the body of liquid 22 and is fixed in space by suitable support means, not shown. This side of the system includes a constant volumetric flow regulator 27 for supplying gas at a bubble rate of 10–30 bubbles per minute at varying back pressure due to changes in head, for head measurement. A surge tank 32 and a restrictor 36 attenuate the bubble surges as previously described.

The level probe 186 is connected into one side of a differential analyzer 222.

The viscosity bubbler probe 20 also has the open end immersed beneath the surface 24 of the liquid 22 and has the outlet fixed at the same depth as the outlet of the level probe 186. The viscosity bubbler probe 20 is fed with a constant volumetric flow of gas at a rate to produce 50+ bubbles per minute. The gas supply system includes a constant volumetric flow regulator 26 and a surge tank 32 and restrictor 36 to attenuate the bubble surges as desired.

The viscosity probe 20 is connected into the other side of the differential analyzer 222.

*Operation*

Since fluctuating atmosphere, if any, is imposed equally on each probe 186 and 20, it is balanced out as a constant.

In the differential analyzer 222, pure head is produced as one signal because the atmosphere is removed by balance between the two probes. The analyzer then substracts this pure head from the viscosity signal so that viscosity is produced as a second pure signal.

A head signal arm 224 extends out of the differential analyzer 222 and suitably actuates an indicator needle 226 that moves relative to a head or level scale 228. Also, the head signal arm 224 is connected to a transducer 64 for the purpose of producing an amplified signal that can be converted into a function of either recording or control.

The function can include the addition of material to the body of liquid 22 to control the level thereof in accordance with the teachings of FIGURE 8, as one application.

A viscosity signal arm 54 also extends out of the differential analyzer 222 and may engage a viscosity indicator needle 58 that moves relative to a viscosity scale 60. Also, the viscosity signal arm 54 is connected to a transducer 64 to produce functions of recording and control. By using a thermocouple 116 in combination with the amplified viscosity signal as taught relative to FIGURE 8, the viscosity-influencing ingredient can be added to control the composition and thus hold the viscosity constant in the body of liquid 22.

*Four probe dependent embodiment for measuring and controlling both viscosity and head under changing head conditions*

Figure 11:
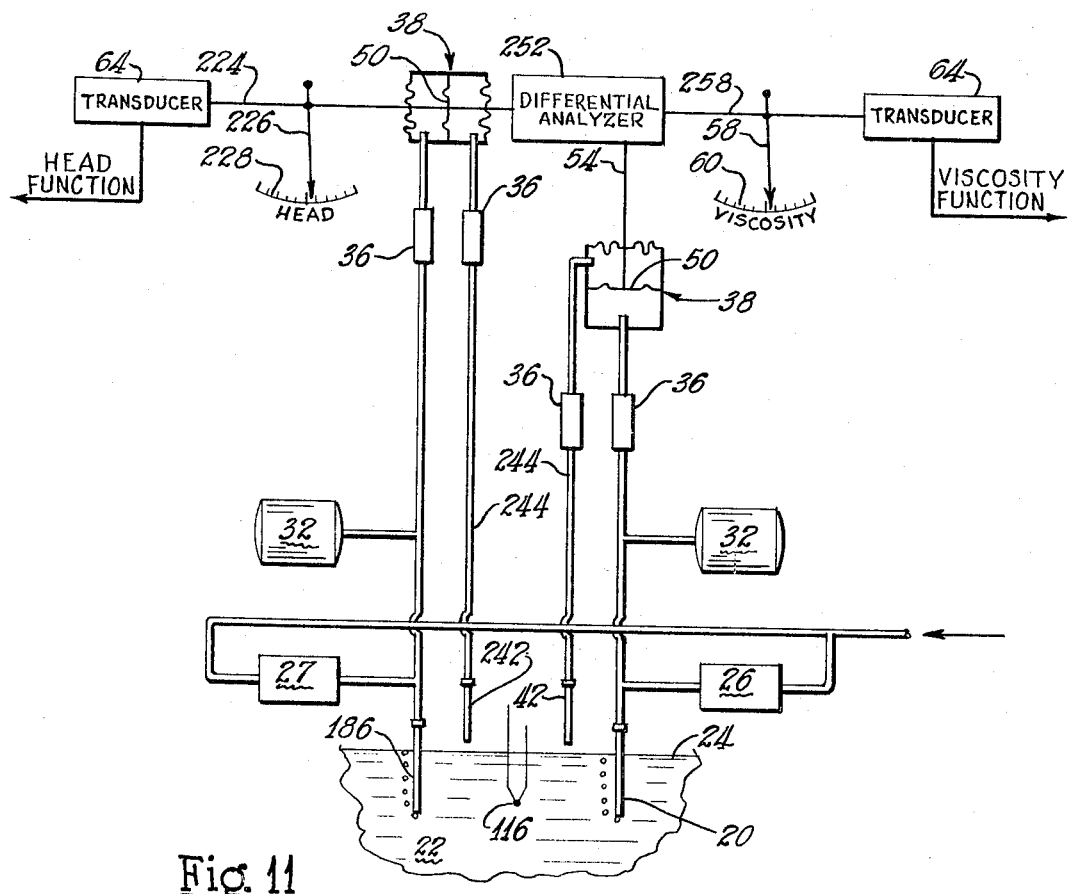
FIGURE 11 is a schematic illustration of a 4-probe system, incorporating a differential analyzer, for producing both pure viscosity and pure head signals under changing head conditions.

This embodiment of the invention is shown in FIGURE 11 and utilizes four probes instead of two probes as in the systems of FIGURES 9 and 10. Also this embodiment uses differential pressure detector cells in combination with a differential analyzer.

Thus, a head probe is used in combination with an atmospheric probe to balance atmosphere out and produce a pure head signal. Further, a viscosity probe is utilized in combination with an atmospheric probe so that atmosphere can be subtracted from a combination of atmosphere, viscosity and head to yield a combination viscosity-head signal.

By running head as one signal into a differential analyzer and head plus viscosity as another signal into the differential analyzer, head can be cancelled out and a pure viscosity signal provided for producing a function of recording and/or control.

Here, the pure head signal is taken off for use before the signals go into the differential analyzer. The differential analyzer thus is called on to produce only a pure viscosity signal as distinguished from the embodiment of FIGURE 9 where the differential analyzer 222 produced separate, pure head and pure viscosity signals.

This embodiment of the invention has been found to be highly adapted for practical application because of the pure signals produced and because of the substantial absence of inter-signal interference. Further, the differential analyzer is less complex than the unit 222 of FIGURE 10 since it only has to produce a single signal.

*The head probes*

The head bubbler probe 186 has the open end immersed to a fixed depth beneath the surface 24 of a body of liquid 22. This probe system includes a constant volumetric flow regulator 27 which supplies gas at varying back pressure depending upon head, but at a constant bubble rate in the range of 10 to 30 bubbles per minute for head measurement. A surge tank 32 and restrictor 36 attenuate the pressure surges from bubble production.

The head probe is connected into one side of a differential pressure detector cell 38.

An atmospheric probe 242 is used to balance out atmosphere fluctuations. The connecting tube 244 for the atmospheric probe 242 suitably includes a restrictor 36 for attenuating any atmospheric surges.

The atmospheric probe 242 is connected into the other side of the differential pressure cell 38.

A head signal arm 224 is connected to the movable diaphragm 50 of the differential pressure detector cell 38 and suitably actuates a head indicator needle 226 that moves relative to a head scale 228. Further, the head signal arm 224 is connected into a transducer 64.

The transducer 64 amplifies the head signal for converting it into a function of either recording and/or control. Thus, by directing the actions of a variable feeder as in FIGURE 8, it can be used to hold the level 24 of the liquid 22 constant.

From the foregoing it will be understood that by taking the head signal off before it reaches the differential analyzer 252, useful work can be performed.

The head signal arm 224 also extends out of the other side of the differential pressure detector cell 38 and is connected into the differential analyzer 252. This feeds a pure head signal to the analyzer 252. As will be developed hereinafter, the differential analyzer 252 also receives a viscosity plus head signal from the viscosity probe system and the differential analyzer subtracts the head to produce a pure viscosity signal.

*The viscosity probes*

The viscosity probe 20 has the open end immersed to a fixed depth beneath the surface 24 of the liquid 22. This includes a constant volume flow regulator 26 which supplies gas at a varying back pressure depending upon viscosity and head, but at a constant bubble rate in the range of 50 or more bubbles per minute for viscosity measurement. A surge tank 32 and restrictor 36 attenuate bubble surges as desired.

The viscosity probe 20 is connected into one side of a differential pressure detector cell 38.

To balance off fluctuations of atmosphere, an atmosphere probe 42 is used as in the head probe system. The connecting tube 244 for the atmospheric probe 42 suitably includes a restrictor 36 for attenuating atmospheric surges.

The atmospheric probe 42 is connected into the other side of the differential pressure detector cell 38.

A viscosity-head signal arm 54 is connected to the movable diaphragm 50 of the differential pressure detector cell 38 and is connected into differential analyzer 252. It will be understood that the viscosity signal arm 54 sends a signal including both viscosity and head into the differential analyzer 252.

The differential analyzer

Within the differential anlyzer 252, the head signal is subtracted from the viscosity plus head signal to yield a pure viscosity signal.

A viscosity signal arm 258 extends out of the differential analyzer and may engage a viscosity indicator needle 58 that moves relative to a viscosity scale 60. Further, the viscosity signal arm 258 is connected to a transducer 64 for signal amplification. The transduced signal is capable of producing a function.

Addition of thermocouple

If a thermocouple 116 is added to the system, control of viscosity can be provided using the principles developed relative to the embodiment of FIGURE 8. Thus, temperature can be held constant by means of controlling equipment connected to the thermocouple 116. A cross-connection is made between the thermocouple control mechanism and the viscosity control mechanism to provide a null point when viscosity matches temperature, indicating proper composition.

It will be understood that control of the viscosity will amount to control of composition. Thus, the present invention, by measuring viscosity, can be used to control composition of a liquid that has a temperature-dependent viscosity. This would include glass, sugar solutions, and viscous liquids of many kinds, and would be applicable not only to the glass industry and the syrup and food processing industry, but to the petroleum industry and the chemical industry as well. Many potential uses will be evident to those skilled in the art.

A practical advantage of this system is that it will ride right on through any changes in level and still produce an accurate and pure viscosity signal. In practical applications there will usually be small level changes in any dynamic or moving system. Further, in this embodiment, head can be controlled or not as desired. This has been found to be a highly practical system for use in a production operation.

Four probe independent embodiment for measuring and controlling both viscosity and head under changing head conditions This embodiment of the invention is shown in FIGURE 12 as applied to a glass melting tank 66 but the invention is not to be so limited.

In this embodiment of the invention, head measurement and control nad viscosity measurement and control are independent and distinct systems as distinguished from the cross-connected system of FIGURE 11. Thus, in this system head is separately controlled and converted into a constant. Viscosity is also separately measured and controlled by a separate two probe system plus thermocouple to proportion the feed of a viscosity-influencing agent as in the embodiment of FIGURE 8.

Accuracy of measurement in this system would be theoretically perfect. However, in actual application, some fluctuation of head or level will occur. Accuracy nevertheless in this system is still high and many practical applications are possible.

The head probe

The head bubbler probe 186 as in prior embodiments is supplied with a constant volumetric flow of gas at a variable back pressure dependent on head and at a suitable pressure sufficient to meet all conditions. The bubble rate is 10 to 30 bubbles per minute. A surge tank 32 and restrictor 36 are included in the system. The head probe 186 is connected to one side of the differential pressure detector cell 38.

To balance off fluctuating atmosphere, an atmosphere sensing probe 242 is used. A restrictor 36 is suitably included in this probe system. The atmosphere probe 242 is connected into the other side of the differential pressure detector cell 38.

A head signal arm 224 is connected to the movable diaphragm 50 of the differential pressure detector cell 38 and suitably activates an indicator needle 226 that moves relative to a head scale 228. Also, the head signal arm 224 is connected to a transducer 64.

The transducer 64 amplifies the head signal for conversion to a function. Thus, the transducer 64 is connected to the controller of the variable speed drive 86 for the primary screw feeder 84. The screw feeder 84 supplies blended batch materials 80 to the pool of molten glass 22 within the glass melting tank 66.

The viscosity probe

A viscosity probe 20 is immersed to the same depth as the level probe 186. This is supplied with suitable gas at a pressure to meet all conditions by a constant flow controller 26. The back pressure on this gas will vary reflecting viscosity and head. Bubble rate of 50+ bubbles per minute for viscosity measurement in accordance with the principles of the invention will be provided. The surge tank 32 and restrictor 36 are included in this system.

The viscosity probe 20 is connected into one side of a differential pressure detector cell 38.

An atmospheric probe 42 balances off atmosphere and is connected into the other side of the differential pressure detector cell 38.

A viscosity signal arm 54 is connected to the movable diaphragm 50 of the differential pressure detector cell 38 to produce a visible signal if desired, and is further connected into a transducer 64.

Since head is held theoretically constant, pure viscosity is produced by the transducer 64 to provide a pure viscosity function.

By incorporating a thermocouple 116 into this system, the temperature of the molten glass 22 can be held constant by control of the firing level of the burners 102, through a control mechanism 112.

Cross-connection between the thermocouple controller 120, connected to control mechanism 112, and the viscosity transducer 64 provides appropriate control for the drive mechanism 98 of the secondary screw feeder 92. Thus, proper proportioning of the viscosity-influencing ingredient through chute 96 can be assured through accurate rate of operation of the secondary screw feeder 92 as established relative to the embodiment of FIGURE 8. By holding temperature and level constant, composition can be controlled by measuring viscosity and holding it to an established level.

Logical extensions of the invention

This concludes the description of the open conduit applications of the invention. However, further applications are encompassed within the scope of invention and include the measurement of viscosity of liquids within closed conduits or vessels under super atmospheric pressures and under both static and dynamic conditions of either no flow or flow. Some of these are developed hereinafter.

*Pipes or conduits*

As shown in FIGURE 13, a closed pipe or conduit 264 is used to carry a liquid material 266 in a flow direction 268.

Let it be presumed that pressure or head fluctuate as in any practical application, due to fluctuations in a pump 270 moving the liquid through the conduit 264. Therefore, a head probe 186 is used and is connected to a differential pressure detector cell 38. The other side of the cell 38 is suitably vented to the atmosphere since the pump 270 also works against the atmosphere.

The result is that the differential pressure detector cell 38 produces a pure head signal that can be used to control the pump 270 and hold the head as constant as practical depending upon the equipment.

For highest accuracy of composition, the pure head signal is also fed into the differential analyzer 252.

A viscosity bubbler probe 20 is connected to a differential pressure detector cell 38 with the other side of the cell balanced to atmosphere. This will give the same atmosphere factor on the viscosity side of the differential analyzer as on the head side.

The viscosity plus head signal from the detector cell 38 is also fed into the differential analyzer 252 where head is removed and a pure viscosity signal is produced. By including a thermocouple 116 and appropriate control mechanism, with an interconnection to the transducer for the viscosity side of the system, the viscosity of the liquid 266 can be controlled in the manner hereinbefore set forth. Thus, an ingredient blending system 272 would be actuated by viscosity-temperature functions.

The foregoing system presumes that the liquid in the conduit 264 can tolerate a small amount of an appropriate gas. Here, it will be necessary that the gas emitted through the probe tubes 186 and 20 be not only under sufficient pressure to overcome the pressure of the liquid 266, but also under enough additional pressure to produce a constant flow of discrete bubbles at a selected rate.

As an alternative to balancing the viscosity differential pressure detector cell 38 to atmosphere in FIGURE 13, it may be balanced to the liquid as shown in the dotted outline in FIGURE 13. This applies to the viscosity side only. Thus, putting a static head sensing tube 20' opposite the viscosity bubbler would balance out head. On the head side the probe must be balanced against atmosphere to produce a head signal.

From the foregoing it will be evident that a simplified modification of this system can be used where the pressure within the conduit is held constant.

Further extensions of the invention will include closed vats with means for releasing gas from the atmosphere above a liquid, at the rate at which it is introduced through the viscosity bubbler so that the bubbler always works against a constant head. Alternately, a head bubbler probe system can be used where head is subtracted in accordance with the principles developed herein. Thus, within the scope of the invention both closed and open conduit or container operations as for making candy, optical glass in batch with an inert gas atmosphere above it, and others will be evident to those skilled in the art.

*Practical considerations*

In a particular embodiment of the present invention, the probe tubes comprised high-temperature-resistant metal of about ¼" outside diameter and having a wall thickness of about .02". With the lower ends of the tubes immersed from about 1" to about 2" below the surface of molten glass, clean air was delivered at a rate in the head tube to form approximately 10 to 30 discrete bubbles per minute. On the viscosity side, the bubble rate was 50 or more bubbles per minute. Signal generation therefore was continual, as a succession of intermittent pulses. The bubbles were of a diameter less than the distance from the outlets of the probes to the surface of the glass so that the bubbles did not bridge the probe tip-to-surface distance.

Bubbles of this diameter are formed as the result of the relationship of molten glass viscosity, the small size of the probes and the low, but different pressures at which the gases are supplied to the probe tubes. It has been found that about ½" of water difference in the gas pressure between the tubes provides the bubble rates alluded to.

In the extended scope of the invention the size and wall thickness of the probe tubes is not to be limited. Thus, a probe of ⅛" outside diameter tubing with .02" wall thickness also could be used. Further, a ⅜" outside diameter tube could be used.

In its broadest aspects, the present concept is theoretically applicable to a single bubble hanging on or developed at the end of a level probe. This is based on the fact that a given pressure will be required to produce the bubble at a given head. The change in back pressure becomes a reflection of head as established hereinbefore.

When other liquids of substantially differing viscosity from glass are measured, bubble rates appropriate to the measurement will become apparent through practical application studies of the invention.

*Probe outlet depth*

Probe outlet immersion depth in the range from about 1" to about 2" has been successfully utilized in applying the present invention to the measurement of glass viscosity and head. This clearly demonstrates the versatility of the invention for measuring shallow glass flow conditions as in the forehearth of a glass melting furnace. However, measurements in deeper flow zones and in other liquids than glass can be made with a high degree of accuracy, utilizing a greater immersion depth if desired.

In the practical aspects of the invention, the viscosity and head signals can be fed to a computer for regulation of variables of the melting operation including firing temperature, ingredients going into the batch and others for control of viscosity, composition and head factors thus stabilizing these as substantial constants for highest quality product output at optimum production efficiencies.

Inherent in the present invention is also the establishment of a selected viscosity and head. Thus, the indicator needle or needles can be moved to a certain setting and held there. This will cause the associated control mechanism to establish head and viscosity to match the settings. When the settings are reached, the system will stabilize.

In accordance with the broad aspects of the invention a liquid having a composition-sensitive viscosity at a constant temperature can have the composition controlled. Thus, liquid compositions having temperature-sensitive viscosities as well as molten glass are to be included. These would include plastics, aqueous syrups, candy batches, chemical reactions, etc.

I claim:

1. In a process of measuring the viscosity of a body of molten glass having a surface, the steps of
    discharging a constant flow volume stream of gas into the molten glass at a submerged level below the surface as a series of discrete bubbles of a diameter less than the submerged level to surface distance at a rate sufficient to produce a viscosity-sensitive back pressure in the stream of gas,
    and sensing the back pressure of said stream of gas produced by viscosity to provide a signal reflecting viscosity of the molten glass.

2. In a process of measuring the viscosity of a liquid, the steps of
    discharging a constant flow volume stream of gas into the liquid at a submerged level beneath the surface at a rate to form a series of discrete bubbles that change in rate of formation with change in viscosity of the liquid, and sensing the rate of formation of said bubbles to provide a signal reflecting change of viscosity of the liquid.

3. In a process of measuring the viscosity of a liquid, the steps of discharging a constant flow volume stream of gas into the liquid at a submerged level beneath the surface at a rate to form a series of discrete bubbles that produce individual back pressure differential pulses that have a magnitude commensurate with the viscosity of the liquid, and sensing the magnitude of the pressure differential pulses to provide a signal reflecting viscosity of the liquid.

4. In a process of sensing the viscosity of a body of liquid that is subject to an atmosphere that fluctuates in pressure level, the steps of bubbling a constant flow volume stream of gas into the liquid at a submerged level beneath the surface at a rate to produce a viscosity-sensitive back pressure in the stream of gas, the hydrostatic head of the liquid and the atmosphere above the liquid also contributing to the back pressure, sensing the total back pressure of said stream of gas, separately sensing the pressure of said atmosphere plus the hydrostatic head, and subtracting the pressure of the atmosphere plus hydrostatic head from said total back pressure to provide a signal reflecting pure viscosity of the body of liquid.

5. In a process of measuring the viscosity of a body of liquid that is subject to an atmosphere, the steps of bubbling a constant flow volume stream of gas into the liquid at a submerged level beneath the surface and at a rate to produce a viscosity-sensitive back pressure in the stream of gas, sensing the total back pressure of said stream of gas, separately sensing the pressure of said atmosphere, and subtracting the pressure of the atmosphere from said total back pressure to provide a signal reflecting viscosity of the liquid.

6. In a process of measuring the viscosity of a body of liquid, the steps of bubbling a constant flow volume stream of gas into the liquid at a submerged level beneath the surface at a rate to produce a viscosity-sensitive back pressure in the stream of gas, the head of liquid also contributing to the back pressure, sensing combined back pressure of viscosity and head on said stream of gas, separately sensing back pressure produced by the head of liquid, and subtracting the pressure of head from combined back pressure of viscosity and head to provide a signal reflecting viscosity of the liquid.

7. In a process of measuring the viscosity of a liquid having a fixed level, but that is subject to an atmosphere that fluctuates, the steps of bubbling a constant flow volume stream of gas into the liquid at a submerged level beneath the surface and at a rate to produce a viscosity-sensitive back pressure in the stream of gas, the atmosphere above the liquid also contributing to the back pressure, sensing the total back pressure imposed on the stream of gas, separately sensing the pressure of said atmosphere, and subtracting the pressure of the atmosphere from said total pressure to provide a signal reflecting viscosity of the liquid.

8. In a process of measuring both head and viscosity of the body of liquid, the steps of bubbling a first constant flow volume stream of gas into the liquid at a submerged level beneath the surface at a rate to produce a viscosity-sensitive pressure in the stream of gas, the head of liquid also contributing to the back pressure, sensing combined back pressure of viscosity and head in said first stream to provide a first signal reflecting viscosity plus head, bubbling a second constant flow volume stream of gas into the liquid at said submerged level at a rate to produce a head-sensitive back pressure in the stream of gas, sensing the back pressure of said second stream to produce a second signal reflecting head of liquid, separating said head signal, and subtracting the head back pressure of said second stream from the combined back pressure of viscosity and head of said first stream to provide a third signal reflecting viscosity of the liquid.

9. In a process of measuring both head and viscosity of a body of molten glass subjected to an atmosphere that fluctuates in pressure, the steps of bubbling a first constant flow volume stream of gas into the molten glass at a submerged level beneath the surface at a rate to produce a viscosity-sensitive back pressure in the stream of gas, the head of molten glass and the atmosphere also contributing to the back pressure, sensing the total back pressure in said first stream, sensing the pressure of said atmosphere, subtracting the pressure of the atmosphere from the total back pressure of said first stream to produce a viscosity signal that also includes head, bubbling a second constant flow volume stream of gas into the molten glass at said submerged level at a rate to produce a head-sensitive back pressure in the stream of gas, the atmosphere also contributing to the back pressure, sensing the total back pressure in said second stream, subtracting the pressure of the atmosphere from the total back pressure of the second stream to produce a signal reflecting pure head of the liquid, converting the pure head signal into a function, subtracting the pure head signal from the viscosity plus head signal to provide a pure viscosity signal, and converting the pure viscosity signal into a function.

10. In a process of controlling the composition and head of a body of liquid subject to an atmosphere that fluctuates in pressure, the liquid having a temperature-sensitive viscosity and the liquid containing a viscosity-sensitive ingredient, the steps of maintaining the temperature of the liquid constant, bubbling a first constant flow volume stream of gas into the liquid at a submerged level at a rate to produce a viscosity-sensitive back pressure, the head of liquid and the atmosphere also contributing to the back pressure, sensing the total back pressure in said first stream, subtracting the pressure of the atmosphere from the total back pressure of the first stream to produce a head plus viscosity signal, bubbling a second constant flow volume stream of gas into the liquid at said submerged level at a rate to produce a head-sensitive back pressure in the second stream of gas, the atmosphere also contributing to the back pressure, sensing the total back pressure in the second stream, subtracting the pressure of the atmosphere from the total back pressure of the second stream to produce a signal reflecting pure head of liquid, converting the pure head signal into a function to control the level of said body, subtracting the pure head signal from the viscosity plus head signal to provide a pure viscosity signal, and feeding viscosity-influencing ingredient into the body of liquid in response to said viscosity signal to maintain viscosity constant and thereby control composition.

11. In a process of measuring viscosity of a body of liquid subject to a fluctuating atmosphere, the steps of
holding the head of said liquid constant,
bubbling a constant flow volume stream of gas into the liquid at a submerged level beneath the surface at a rate to produce a viscosity-sensitive back pressure in the stream of gas, the head of the liquid and the atmosphere also contributing to the back pressure,
sensing the total back pressure in said stream of gas,
subtracting the pressure of said atmosphere from the total back pressure of said stream to produce a constant head plus variable viscosity signal.

12. In a process of controlling the composition of a body of liquid having a temperature-sensitive viscosity and that contains a viscosity-influencing ingredient, the steps of
maintaining the temperature of said liquid constant,
discharging a constant flow volume stream of gas into the liquid at a submerged level beneath the surface of the liquid to produce a viscosity-sensitive back pressure on the stream of gas,
sensing the back pressure on said stream of gas produced by viscosity to provide a signal reflecting viscosity of the liquid,
and feeding viscosity-influencing ingredient into the body of liquid in response to said signal.

13. In apparatus for measuring viscosity of a liquid wherein head is constant,
a tube having an outlet positioned below the level of the liquid,
supply means for bubbling a constant flow volume stream of gas through said tube and out of said outlet at a rate sufficient to produce a viscosity-sensitive back pressure in the stream of gas,
and detector means for detecting the back pressure on said stream of gas to produce a signal reflecting viscosity of the liquid.

14. In apparatus for measuring viscosity of a liquid,
a tube having an outlet immersed below the surface of the liquid,
supply means for discharging a constant flow volume stream of gas through said tube and out of said outlet at a rate to provide a series of discrete bubbles that produce individual back pressure differential pulses having a magnitude commensurate with the viscosity of the liquid,
and detector means for detecting the magnitude of the pressure differential pulses to provide a signal reflecting viscosity of the liquid.

15. In apparatus for measuring the viscosity of a body of liquid, heat-softenable material,
a tube having an outlet positioned below the level of the liquid at a fixed point in space,
supply means for discharging a constant flow volume stream of gas through said tube and out of said outlet at a rate to provide a series of discrete bubbles that have a rate of formation commensurate with the viscosity of the liquid,
and detector means for detecting rate of formation of said bubbles to provide a signal reflecting viscosity of the liquid.

16. In apparatus for controlling the composition of a liquid having a temperature-sensitive viscosity and that contains a viscosity-influencing ingredient,
heat control means for maintaining the temperature of said liquid constant,
a tube having an outlet positioned below the surface of the liquid at a fixed point in space,
supply means for discharging a constant flow volume stream of gas through said tube at a rate sufficient to produce a viscosity-sensitive back pressure on the stream of gas,
detector means for detecting the back pressure on said stream of gas to produce a signal reflecting viscosity of the liquid,
feeding means for feeding a viscosity-influencing ingredient into the body of liquid at a variable rate,
and transducer means connected to said detector means and to said feeding means to feed viscosity-influencing ingredient into the body of liquid in response to said viscosity signal.

17. In apparatus for measuring the viscosity of a body of liquid that has a variable head,
a first tube having an outlet positioned below the surface of the liquid at a level in space,
supply means for discharging a constant flow volume stream of gas through said first tube into the liquid at a rate to produce a viscosity-sensitive back pressure into the stream of gas, the head of liquid also contributing to the back pressure,
a second tube having an outlet positioned below the surface of the liquid at said level,
supply means for discharging a constant flow volume stream of gas through said second tube and into the liquid at a rate to produce a head-sensitive back pressure in the stream of gas,
a differential pressure detector having isolated sides,
means connecting said first tube into one side of said differential pressure detector and means connecting said second tube into the other side of said differential pressure detector,
whereby the back pressure of the second tube is subtracted from the back pressure of the first tube to produce a signal reflecting viscosity of the liquid.

18. In apparatus for measuring viscosity and head of a body of liquid that has a variable head and is subject to changing atmosphere,
a first tube having an outlet positioned beneath the surface of the liquid at a level in space,
supply means for discharging a constant flow volume stream of gas through said first tube and in through the liquid at a rate to produce a viscosity-sensitive back pressure on the stream of gas, the head of liquid and atmosphere also contributing to the back pressure,
a second tube having an outlet positioned below the surface of the liquid at said level,
supply means for discharging a constant flow volume stream of gas through said second tube and into the liquid at a rate to produce a head-sensitive back pressure in the stream of gas, the atmosphere also contributing to the back pressure,
a differential analyzer,
means connecting said first tube into said differential analyzer and means connecting said second tube into said differential analyzer whereby atmosphere is balanced out of the system as a constant by being imposed equally on the back pressure of each of said streams of gas; the back pressure from the second tube is converted into a head signal; and the head back pressure of the second tube is subtracted from the back pressure of the first tube to produce a viscosity signal.

19. In apparatus for measuring both the viscosity and head of a body of molten glass that has a variable head and is subject to changing atmosphere,
a first tube having an outlet positioned below the surface of the molten glass at a level in space,
supply means for discharging a constant flow volume stream of gas through said first tube and out of the outlet into the molten glass at a rate to produce a viscosity-sensitive back pressure on the stream of gas, the head of molten glass and the atmosphere also contributing to the back pressure,
a second tube having an outlet open to the atmosphere above the molten glass,
a first differential pressure detector having isolated sides, means connecting said first tube into one side of said differential pressure detector and means connecting said second tube into the other side of said differential pressure detector whereby the atmosphere is subtracted from the back pressure of the first tube to produce a signal reflecting viscosity plus head of the molten glass, a third tube having an outlet positioned below the surface of the molten glass at said level in space, supply means for discharging a constant flow volume stream of gas through said third tube and into the molten glass at a rate to produce a head-sensitive back pressure on the stream of gas, the atmosphere also contributing to the back pressure, a fourth tube having an outlet open to the atmosphere above the molten glass, a second differential pressure detector having isolated sides, means connecting said third tube into one side of said second differential pressure detector and means connecting said fourth tube into the other side of said differential pressure detector whereby atmosphere is subtracted from the back pressure of the third tube to produce a signal reflecting pure head of the molten glass, transducer means for connecting said head signal into a function, a differential analyzer, means connecting said viscosity plus head signal from said first differential pressure detector into one side of said differential analyzer and means connecting said head signal from said second differential pressure detector into the other side of said differential analyzer, whereby said head signal is subtracted from said head plus viscosity signal to produce a resultant signal reflecting viscosity only of the molten glass, and means for connecting said viscosity signal into a function.

20. In apparatus for measuring the viscosity and head of a liquid under pressure in a closed conduit, a first tube having an outlet submerged in the liquid, supply means for discharging a constant flow volume stream of gas through said first tube and into the liquid at a rate to produce a viscosity-sensitive back pressure on the stream of gas, the pressure of liquid also contributing to the back pressure, a second tube having an outlet submerged in the liquid, a differential pressure detector having two isolated sides, means connecting said first tube into said differential pressure detector and means connecting said second tube into said differential pressure detector whereby head is balanced out of the system to provide a signal reflecting viscosity of the liquid.

21. In a process of measuring the head of a liquid, the steps of producing a bubble of gas at a submerged point within the liquid, holding the size of the bubble constant, and sensing the back pressure on the bubble to provide a signal reflecting head.

22. In apparatus for measuring head of a liquid, a tube having an outlet positioned below the level of the liquid, supply means for supplying gas through said tube to emerge as a discrete bubble of constant size at said outlet, with the back pressure dependent on head of the liquid, and detector means for detecting the back pressure on said bubble to provide a signal reflecting head of liquid.

References Cited

UNITED STATES PATENTS

| | | | |
|---|---|---|---|
| 1,605,171 | 11/1926 | Chance | 73—439 |
| 2,302,327 | 11/1942 | Kehoe et al. | 73—54 X |
| 2,613,535 | 10/1952 | Born | 73—302 |
| 3,200,971 | 8/1965 | Trethewey | 73—302 X |

DAVID SCHONBERG, *Primary Examiner.*